United States Patent
Riscombe-Burton (10) Patent No.: US 10,290,151 B2
(45) Date of Patent: May 14, 2019

(54) AR/VR DEVICE VIRTUALISATION

(71) Applicant: BlackBerry Limited, Waterloo (CA)

(72) Inventor: Phillip Riscombe-Burton, London (GB)

(73) Assignee: BlackBerry Limited, Waterloo, Ontario (CA)

( * ) Notice: Subject to any disclaimer, the term of this patent is extended or adjusted under 35 U.S.C. 154(b) by 97 days.

(21) Appl. No.: 15/239,346

(22) Filed: Aug. 17, 2016

(65) Prior Publication Data

US 2018/0053350 A1     Feb. 22, 2018

(51) Int. Cl.
| | | |
|---|---|---|
| *G06T 19/00* | (2011.01) | |
| *G06F 3/01* | (2006.01) | |
| *G06F 3/048* | (2013.01) | |
| *G06F 3/0481* | (2013.01) | |
| *G02B 27/01* | (2006.01) | |
| *G06F 9/451* | (2018.01) | |

(52) U.S. Cl.
CPC .......... *G06T 19/006* (2013.01); *G02B 27/017* (2013.01); *G06F 3/011* (2013.01); *G06F 3/016* (2013.01); *G06F 3/048* (2013.01); *G06F 3/0481* (2013.01); *G06F 9/451* (2018.02)

(58) Field of Classification Search
CPC .............................. G06T 19/006; G06F 3/016
See application file for complete search history.

(56) References Cited

U.S. PATENT DOCUMENTS

| | | | | |
|---|---|---|---|---|
| 6,636,929 | B1 * | 10/2003 | Frantz ................. | G06F 11/0709 710/104 |
| 2004/0243385 | A1 * | 12/2004 | Rothman ............... | G06F 3/0605 703/24 |
| 2010/0169069 | A1 * | 7/2010 | Diamant ............... | G06F 13/102 703/24 |

(Continued)

FOREIGN PATENT DOCUMENTS

| | | |
|---|---|---|
| EP | 2980675 | 2/2016 |
| WO | 2017/147111 | 8/2017 |

OTHER PUBLICATIONS

Lee, Jae-ho, "A Test Automation of a Full Software Stack on Virtual Hardware-Based Simulator", Dec. 2009, IEEE Xplore, pp. 37-39. [retrieved on Dec. 9, 2018]. Retrieved from the Internet <URL:https://ieeexplore.ieee.org/abstract/document/5370554> (Year: 2009).*

(Continued)

*Primary Examiner* — Barry Drennan
*Assistant Examiner* — Terrell M Robinson
(74) *Attorney, Agent, or Firm* — Fish & Richardson P.C.

(57) ABSTRACT

Methods, apparatuses and computer-readable media for virtualizing a physical device using an augmented reality (AR) or virtual reality (VR) virtualized or partially virtualized device (an AR/VR device) are provided. In particular, first data of a user interaction with the physical device is received by the AR/VR device from the physical device. The first data of the user interaction with the physical device is converted into second data for representation of the user interaction with the physical device in a virtual representation of the (Continued)

physical device. The virtual representation of the physical device and the representation of the user interaction with the physical device are outputted by the AR/VR device.

19 Claims, 4 Drawing Sheets

(56) References Cited

U.S. PATENT DOCUMENTS

| | | | |
|---|---|---|---|
| 2010/0180284 A1* | 7/2010 | Ross | G06F 9/541 |
| | | | 719/330 |
| 2011/0119671 A1* | 5/2011 | Green | G06F 9/45558 |
| | | | 718/1 |
| 2013/0117377 A1* | 5/2013 | Miller | H04L 67/38 |
| | | | 709/205 |
| 2013/0207963 A1 | 8/2013 | Stirbu | |
| 2014/0366023 A1* | 12/2014 | Chinnamani | G06F 9/45545 |
| | | | 718/1 |
| 2015/0185825 A1 | 7/2015 | Mullins | |
| 2015/0205420 A1* | 7/2015 | Calub | G06F 3/016 |
| | | | 345/173 |
| 2015/0227231 A1* | 8/2015 | Chen | G06F 3/04886 |
| | | | 345/174 |

OTHER PUBLICATIONS

Extended European Search Report issued in European Application No. 17184698.3 dated Oct. 6, 2017; 10 pages.

* cited by examiner

AR/VR DEVICE VIRTUALISATION

FIELD

This disclosure relates to virtualizing devices via an augmented reality (AR) or virtual reality (VR) virtualized or partially virtualized devices (referred to as "an AR/VR device").

BACKGROUND

Augmented reality (AR) is a live view of a physical, real-world environment whose elements are augmented or supplemented by computer-generated sensory input such as sound, video, graphics or Global Positioning System (GPS) data to enhance a viewer's perception of reality. Virtual reality (VR) is a computer technology that simulates a user's physical presence and environment and replaces the real world with a simulated one. AR and VR technologies make the information about the surrounding real world of the user interactive and digitally manipulable.

DETAILED DESCRIPTION

The present disclosure is directed to methods, apparatuses and computer-readable media for virtualizing one or more devices via an augmented reality (AR) or virtual reality (VR) virtualized or partially virtualized device (referred to as "an AR/VR device"). The techniques described in this disclosure can provide virtualisation of a real-word device (referred to as a virtual or virtualized device) using, in part, a model that describes the device's material composition and how it can interact with in an AR/VR platform. The model defines a mapping from user input detected by the AR/VR platform to the input expected by the core functionality of the virtual device, for example, based on computer vision or other techniques.

In particular, the present disclosure introduces the concept of a "devicelet" as a successor to or further development of the ubiquitous smartphone "app." The devicelet can provide a user a virtualized device that includes a virtual representation of a real-world, physical device. The physical device being virtualized can include any physical objects suitable for representation, such as computers, smartphones, tablets, TVs, and projectors, among others. In some implementations, the device being virtualized can include or be associated with a dummy device such as, a keyboard, mouse, touch pad, track pad, and touch screen. Using the dummy device, users can be provided a physical or tactile connection to the virtualized device.

The devicelet includes core functionality that is accessed by a user via the AR/VR device. For example, the user can interact with the virtualized device via the AR/VR device (e.g., a wearable AR headset or a non-wearable VR device). In some implementations, user actions can be detected and interpreted by the hardware of the AR/VR device. The devicelet can convert user actions made or indicated with respect to the virtual representation of the virtualized device into user actions corresponding to the underlying core functionality of the devicelet.

In some implementations, a devicelet can include three components: (i) core functionality; (ii) a virtual model for AR/VR representation; (iii) an emulation component. Core functionality includes the code that allows a devicelet to perform its main functionality. The core functionality may, for example, relate to a whiteboard, a watch, an advertising board, a picture frame, a musical instrument, a notebook, a newspaper, a book or other visualized devices.

In the example of a virtualized electronic whiteboard, this core functionality may encompass processing user touch input as a series of vectors which are then visualized for the user as virtual pen marks, erasing pen marks with a particular gesture or input, and also the saving or restoring of whiteboard sessions for the user. In the example of a virtualized smart phone, the core functionality would be the phone's Operating System (OS). The code for a devicelet's core functionality could be taken directly from the devicelet's equivalent real-world counterpart (where available), having been re-compiled for the architecture of the hosting AR/VR device, or could be written from scratch to exist solely as a virtual device.

The virtual model may include, for example, a virtual screen, frame, or window with optional additional visual embellishments creating the virtual facia of the device. The virtual model can include the visual or other sensual representation of the virtual device.

The emulation component or layer can map user interactions with respect to the virtual representation to inputs expected by the core functionality. For example, the emulation layer can map the interactions by means of gestures, virtualized menus, keypads, keyboards, or control panels to the core functionality.

In some implementations, a devicelet may be implemented, for example, by taking an existing core functionality (e.g., a smartphone app) and applying a wrapping process to embed the emulation component and the associated virtual model.

In some implementations, a devicelet can be realized in an AR/VR platform using a placeholder. In this example, a placeholder is the physical "canvas" on which the AR/VR platform can realize or represent the virtual model of the devicelet. Moreover, the placeholder may provide a physical surface, context and tactile feedback for interaction with the end user, and may also provide input and sensor feedback to the AR/VR platform. The placeholder can be dumb (i.e., containing no electronics or sensors) or partially intelligent, achieving some limited functionality, typically for interfacing with the AR/VR platform.

In some implementations, a devicelet can be secured using security technologies, such as app wrapping or an extension of a software development kit (SDK) with mobile app security, to provide mobile security in AR/VR platforms.

In some implementations, the devicelet can be platform-agnostic. The devicelet can be implemented on various AR/VR devices. The devicelet can be transferrable among different operating systems. In some implementations, a single AR/VR device may be able to support multiple devicelets that provide visualizations of multiple devices simultaneously. In some implementations, interactions between two or more virtualized devices can be implemented.

The devicelet can be implemented in various forms, such as, a hosted (thick client) devicelet, a remote (thin client) devicelet, and a hybrid devicelet. For example, the hosted (thick client) devicelet includes an architecture to host a virtual device on a physical AR/VR device that leverages computer vision to simulate virtualized components. The remote (thin client) devicelet has an architecture that includes a client virtual device residing on a physical AR/VR device and a remote server that performs substantial computations. A hybrid devicelet can have a combination of the hosted and remote architectures.

Figure 1:
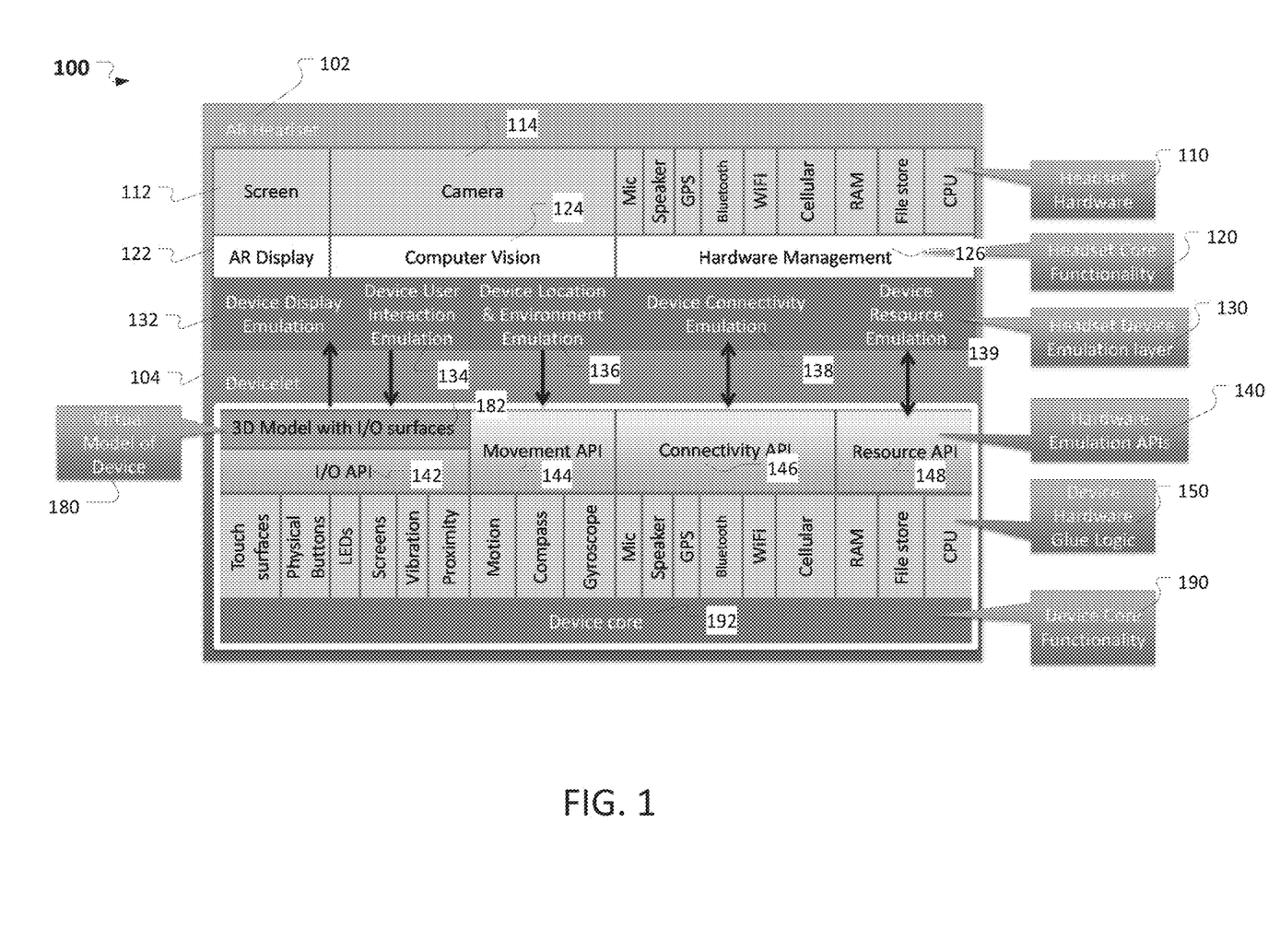
FIG. 1 is a schematic representation of an example hosted devicelet architecture.

FIG. 1 is a schematic representation of an example hosted devicelet architecture 100. The hosted devicelet architecture 100 includes an AR headset 102 and a hosted devicelet 104. Although the examples described in this disclosure uses an AR headset as the example AR/VR device or platform, the AR/VR device can include other types of fully or partially visualized devices, such as handheld AR/VR devices and wearable or non-wearable AR/VR devices.

A hosted devicelet 104 is a thick client that executes the majority of operations relating to the devicelet locally, on the AR headset device 102. This type of devicelet is suitable, but not required, for applications that require an instant response to user interactions (for example, by taking advantage of the low latency design), have a dependency on a number of emulated hardware features (such as a gyroscope or compass), or have multiple complex user interactions/gestures.

The AR headset device 102 can include, for example, headset hardware 110, headset core functionality 120, and headset device emulation layer 130. The headset hardware 110 includes physical hardware components, such as, one or more of a screen 112, a camera 114, a microphone, a speaker, a connectivity or communication (e.g., GPS, Bluetooth, WiFi, or cellular) interface, storage modules (e.g., a random access memory (RAM) and file/data store) and a processor (e.g., a central processing unit (CPU)). The headset core functionality 120 includes, for example, providing AR or VR representations by an AR display module 122, processing and analyzing images, videos, or other media by a computer vision module 124, and managing hardware included or otherwise associated with the AR headset device 102 by a hardware management module 126. The hardware management module 126 can perform a number of tasks for the hosting AR/VR device 102 as well as the hosted devicelet 104. For example, the hardware management module 126 facilitates access to the physical resources of the hosting hardware by its own underlying Operating System (OS) and also manages the access of devicelets (e.g., via the device connectivity emulation 138) and device resource emulation 139. In addition, the hardware management module 126 will pass data (e.g., I/O data) between physical placeholder dummy devices and their paired devicelets and also provide the data channel, for example, for a remotely hosted or hybrid devicelet, between the hosting client AR/VR device and the server-side component.

The headset device emulation layer 130 includes a software layer that enables devicelets to interpret the world around their virtual projections and how users interact with those virtualized projections. The headset device emulation layer 130 can additionally maintain devicelets' access to the physical resources found on the hosting hardware. The headset device emulation layer 130 includes, for example, device display emulation module 132, device user interaction emulation module 134, device location and environment emulation module 136, device connectivity emulation module 138, and device resource emulation module 139.

For instance, the device display emulation module 132 can illustrate the device and its virtual display (e.g., the AR display 122). For example, the device display emulation module 132 can interpret the look and feel of the virtualized device and pass it to the hosting hardware to be drawn to screen.

The user interaction emulation module 134 can identify, process, and respond to inputs to device based on user actions (e.g., changing the location, orientation or other features of the virtualized device based on the user inputs). For example, the user interaction emulation 134 can interpret the user's touches, gestures and other physical interactions with the virtualized device that are received, for example, from the hosting hardware's computer vision module 124 and pass the interaction data to the devicelet via the input/output (I/O) application program interface (API) 142.

The device location and environment emulation module 136 can simulate the location and environment of the device. The device location and environment emulation module 136 can interpret the resultant movement of the virtualized device that are received, for example, from the hosting hardware's computer vision module 124, and passes the motion, orientation and acceleration data to the devicelet via the movement API 144.

The device connectivity emulation module 138 can provide connectivity capabilities that include connectivity capabilities physically-enabled by the device being virtualized and may also include virtual connectivity capabilities, for example, enabled by the AR headset device 102. For example, the device connectivity emulation module 138 manages access of the connectivity technologies of the hosting hardware by devicelets via the connectivity API 146.

The device resource emulation module 139 can provide and simulate resources available or accessible by the device. For example, the device resource emulation module 139 manages access of the storage resources of the hosting hardware by devicelets via the resource API 148.

The devicelet 104 can include, for example, hardware emulation APIs 140, device hardware glue logic 150, virtual model of device 180, and device core functionality 190. The hardware emulation APIs 140 includes, for example, I/O API 142, movement API 144, connectivity API 146, and resource API 148. These APIs can provide input to and from the emulation and hardware logic.

In some implementations, the I/O API 142 can connect virtualized components presented in the 3D model to the device core and activate their various characteristics. For example, if a virtual LED is instructed to turn on, the I/O API 142 can connect the request with the correct virtualized LED on the virtualized model and make it appear illuminated. As another example, if a touch is made on a devicelet's virtualized touch-sensitive display, the I/O API 142 can receive the interaction from the emulation layer and then convert the interactions to location/pressure data for the device core. If a virtual display needs to refresh its current screen, the I/O API 142 can receive new display data from the device core, and then convert the new display data into a format that the emulation layer can utilize, which is then passed to the emulation layer for displaying on the virtualized device's surface.

In some implementations, if a virtual device contains a virtualized electromagnet, rumble motor or exterior motors, then those interactions with the user may need further interpretation within the emulation layer 130. For example, other virtualized objects could be attracted to a visualized electromagnet. Virtual rumble motors may need some on-screen visual indication to the user when enabled. Virtual motors on the exterior of the virtualized device may cause the virtual device to move location without interaction by the user.

The movement API 144 can receive motion, orientation and acceleration data from the emulation layer 130 and presents the data to the device core 192, for example, in terms of the various forces the virtualized motion technologies can understand. The movement API 144 can send data to the device core 192 that relates to the movement and forces acting upon the virtualized device. For example, in the case of a compass, the data would be the new direction that the virtual device is facing. In the case of an accelerometer, the data can include changes in velocity of the virtual device. In some implementations, the data can also include data associated with altimeters.

The connectivity API 146 can serve as a bridge between the specific connectivity technologies (e.g., Bluetooth, near filed communications (NFC), GPS, WiFi, cellular communications, and cellular communications) the device core 192 is expecting to have access to and the actual physical components that the hosing hardware has available.

Similar to the connectivity API 146, the resource API 148 can form a bridge between the format of the storage of the device core 192 is expecting and the actual format the hosting hardware utilizes.

The device hardware glue logic 150 can include logic that handles interactions associated with hardware such as, touch surfaces, physical buttons, LEDs, screens, vibration generators, proximity sensors, motion detectors, compass, gyroscope, microphone, speaker, connectivity or communication (e.g., GPS, Bluetooth, WiFi, or cellular) interfaces, storage modules (e.g., a RAM and file/data store) and processors (e.g., CPUs).

The device core functionality 190 can include the main logic to perform specialized functionality at the device core 192. For example, if the devicelet provides a virtualized smartphone or tablet, the device core 192 can be running and managing applications of the smartphone or tablet. The device core 192 can be ported directly from existing real-world devices (e.g., the smartphone or tablet) or created especially for use in a virtual environment.

In some implementations, some devices may need particular hardware elements emulated for them. An example of this would be a virtual device which includes a gyroscope, whereby the gyroscope component does not actually exist. In this example, the AR headset 102 would instead compute the movements and interactions of the virtual device and emulate the output of a gyroscope that would have been present within the virtual device based on the orientation of the virtual device in the AR space. In this example, the main component of this logic can be carried out within the headset device emulation layer 130. The emulated output can be subsequently passed to a target devicelet 104 via a defined movement API 144. Then the devicelet 104 can bridge this data via the device hardware glue logic 150 to the device core 192. In some implementations, dummy devices may have some functionality available to provide feedback, such as a gyroscope.

In a similar manner, to provide virtualized devices that have access to their own connectivity hardware such as Bluetooth, Wi-Fi, Cellular and GPS that do not physically exist, the AR headset 102 can make its own connectivity hardware available via the headset device emulation layer 130 and a connectivity API 146. For example, where the devicelet 104 is a virtualized mobile telephone, the devicelet 104 would use the AR headset's connectivity hardware as its own.

In some implementations, the AR headset 102 requires a three-dimensional (3D) model or wireframe (e.g., virtual model of device 180) to virtualize a device and display it for the user. This 3D model 180 can outline surfaces for particular user interactions that can, then, be monitored for gestures made by the user. The 3D model 180 can include information about, for example, how the devicelet 104 tracks relatively to a real-world object, placeholder device or set of markers, details of materials used for each surface, and how the surfaces respond to touch, physical items such as buttons, switches LEDs and surface sensors. In some implementations, details about virtual menus available to the devicelet (for example, in order to change the look and feel of the facia of the device and other visual embellishments) can be contained within a separate settings XML file.

Figure 2:
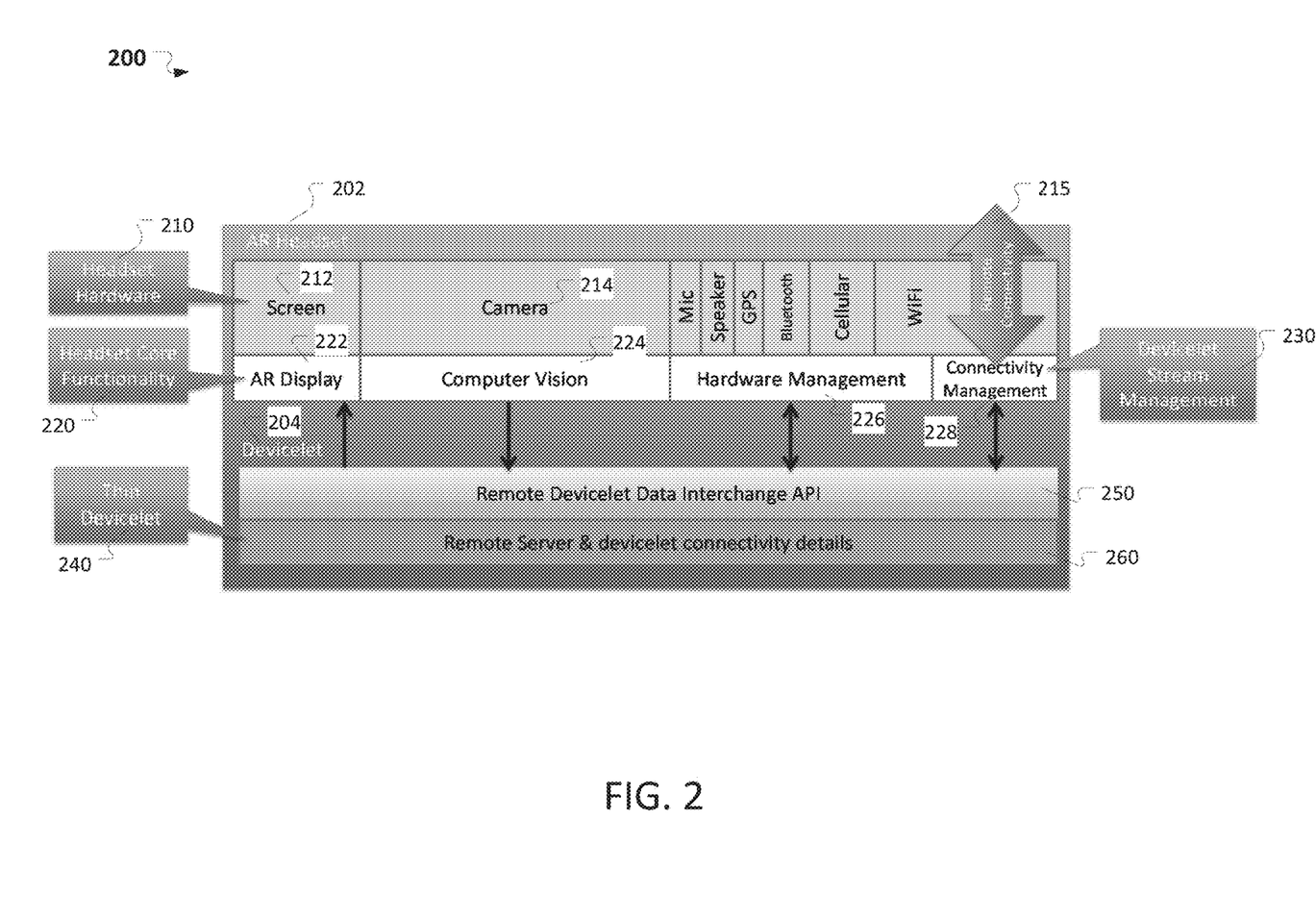
FIG. 2 is a schematic block diagram illustrating an example client-side architecture of a remote devicelet.

FIG. 2 is a schematic representation of an example client-side architecture 200 of a remote devicelet. A remote devicelet includes a thin client 240 (e.g., a client-side devicelet 204) that offloads the majority of its work to a remote server (e.g., a server 302 in FIG. 3). The client-side devicelet 204 can redirect user interactions and local headset hardware connectivity to the remote server which hosts the devicelet's core functionality. In some implementations, this remote type of devicelet suits more traditionally virtualized devices, such as Remote Desktop Protocol (RDP) personal computers (PCs) and Macs (e.g., remotely accessible machines over technologies such as Microsoft Remote Desktop Connection, Apple's Screen Share, Team Viewer or 'Go To My PC'). RDP devices can be hosted in a server rack and accessed by another client machine over software based on the RDP protocol. This remote type of devicelet can be used for virtualized devices that require minimal or basic user interactions, such as mouse movement or keyboard entry and in return update a well-defined screen or region.

The example client-side architecture 200 of the remote devicelet includes an AR headset 202 and a client-side remote devicelet 204. The AR headset 202 can be similar to, or different from, the AR headset device 102 in the hosted devicelet architecture 100 as shown in FIG. 1. As illustrated in FIG. 2, the AR headset 202 can include, for example, headset hardware 210, headset core functionality 220, and devicelet stream management 230. The headset hardware 210 includes, for example, one or more of a screen 212, a camera 214, a microphone, a speaker, and a connectivity or communication (e.g., GPS, Bluetooth, WiFi, or cellular) interface. The headset core functionality 220 includes, for example, AR display 222, computer vision 224, and hardware management 226, and client-side connectivity management 228. The devicelet stream management 230 includes, for example, client-side connectivity management 228 that can provide remote connectivity 305 to a remote server which hosts the devicelet's core functionality.

The client-side remote devicelet 204 can include, for example, a remote devicelet data interchange API 250 and remote server and devicelet connectivity details 260. The connectivity details 260 can include, for example, the location of the server (IP Address/URL) and the services that need to be consumed. The client-side remote devicelet is light in regards to the core computational burden put on the AR headset 102. In a basic form, the client-side remote devicelet 204 redirects user interactions and related hardware responses to a server component (e.g., a server 302 in FIG. 3) and relays the response to the screen and other local hardware of the AR headset 202. The client-side connectivity management 228 redirects requests, made by one or more local devicelets (e.g., the devicelet 204), to their server side counterparts and returns any relevant responses via the data interchange API 250. The remote server can perform, for example, data processing similar to that of a hosted devicelet (e.g., the devicelet 104 in FIG. 1), and return the streamed visual response to the client headset's AR display (e.g., the AR display 222).

Figure 3:
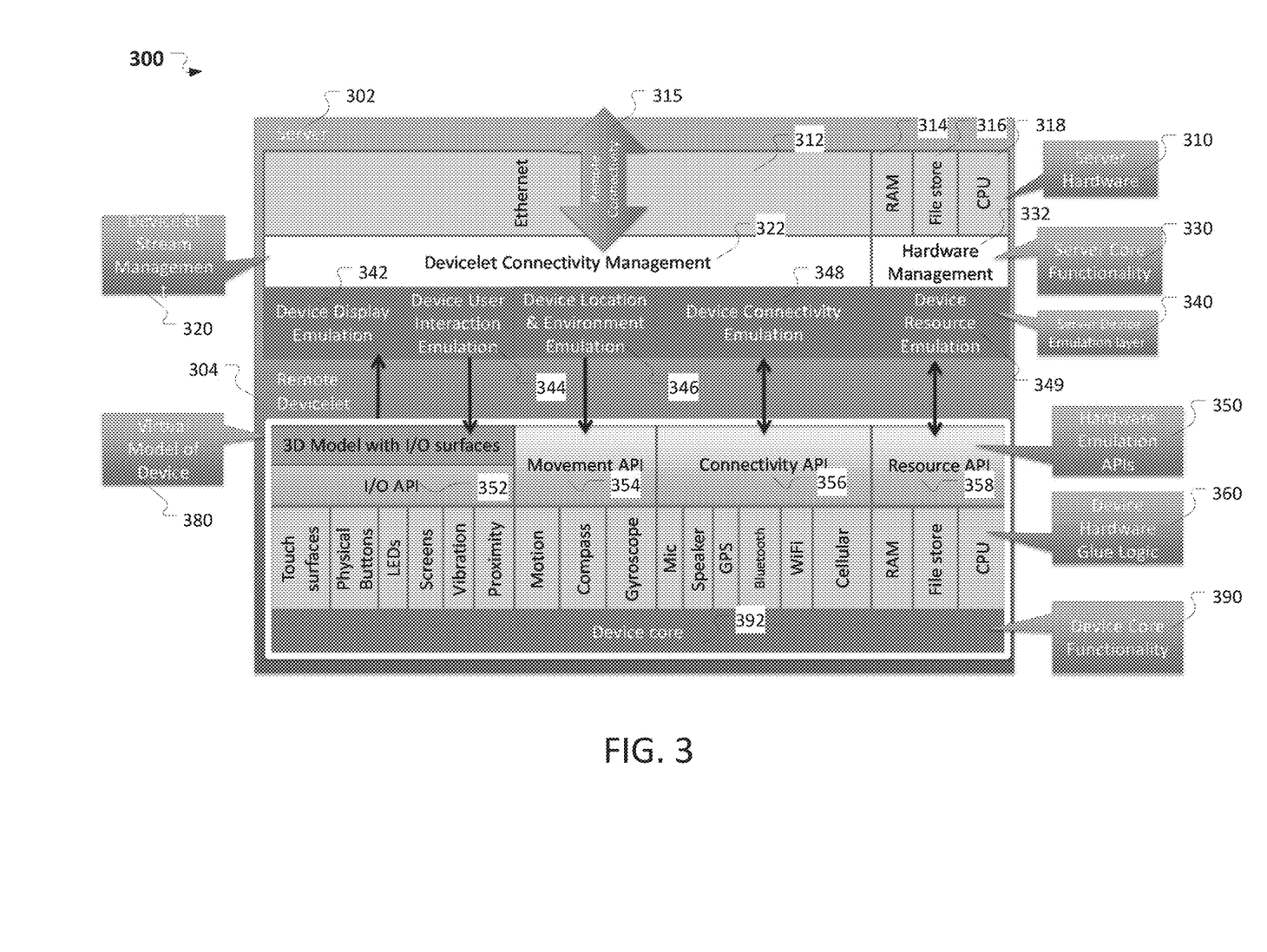
FIG. 3 is a schematic block diagram illustrating an example server-side architecture of a remote devicelet.

FIG. 3 is a schematic representation of an example server-side architecture 300 of a remote devicelet. The example server-side architecture 300 includes a server 302 and a server-side remote devicelet 304. The server 302 can include, for example, server hardware 310, devicelet stream management 320, server core functionality 330, and server device emulation layer 340. The server hardware 310 can include one or more of, for example, a connectivity or communication (e.g., Ethernet, GPS, Bluetooth, WiFi, or cellular) interface 312, storage modules (e.g., a RAM 314 and file/data store 318) and a processor (e.g., a CPU 318). The devicelet stream management 320 includes, for example, devicelet connectivity management 332. The devicelet connectivity management 332 can provide server-side remote connectivity 315 to the client-side remote devicelet (e.g., the client-side remote devicelet 204 in FIG. 2). For example, the devicelet connectivity management 322 receives requests made by client-side devicelet 204 and redirects those requests to the appropriate emulation component. The server device emulation layer 340 makes sense of the data provided, communicates with the target server-side devicelet component via an appropriate API and returns corresponding responses. For example, as part of its response to requests, the server-side devicelet 304 can effectively send an audio and video stream response to the client-side devicelet 204 via the connectivity management 322, so that the computational load is light on the client-side devicelet 204.

The server core functionality 330 includes, for example, hardware management 332. The server device emulation layer 340 includes, for example, device display emulation module 342, device user interaction emulation module 344, device location and environment emulation module 346, device connectivity emulation module 348, and device resource emulation module 349. The server device emulation layer 340 and its components can be implemented in a similar manner as their thick-client counterparts as described with respect to FIG. 1.

The server-side remote devicelet 304 can include, for example, hardware emulation APIs 350, device hardware glue logic 360, virtual model of device 380, and device core functionality 390. The hardware emulation APIs 350 includes, for example, I/O API 352, movement API 354, connectivity API 356, and resource API 358. The device hardware glue logic 360 includes logic handling interactions associated with hardware such as touch surfaces, physical buttons, LEDs, screens, vibration generators, proximity sensors, motion detectors, compass, gyroscope, microphone, speaker, connectivity or communication (e.g., GPS, Bluetooth, WiFi, or cellular) interfaces, storage modules (e.g., RAM and file/data store) and processors (e.g., CPUs).

The device core functionality 390 includes the main logic to perform specialised functionalities at the device core 392. The device core 392 can reside on the server-side remote devicelet 304.

In some implementations, a devicelet can have a hybrid architecture where varying degrees of functionality are carried out locally (such as the IO and display emulation functions that need minimal latency), while other functionalities are performed remotely by the server. One advantage of such systems may be to use currently existing hardware capable of some, but not all, functionality in a devicelet implementation. By using existing capabilities for devices, costs can be reduced with a potentially faster response time by executing at least some device functionality locally.

Figure 4:
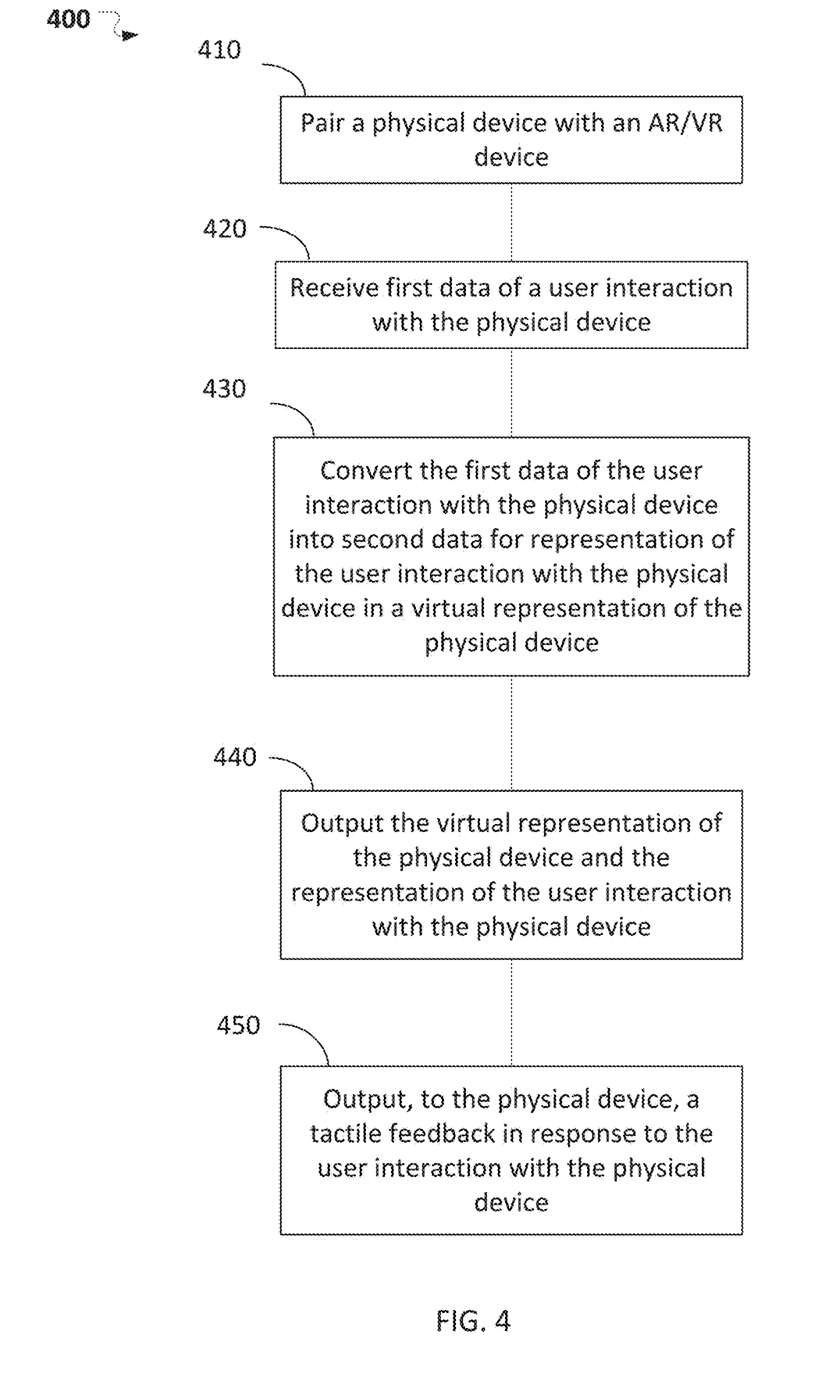
FIG. 4 is a flow chart illustrating an example method 400 for virtualizing a physical device using an AR/VR device.

FIG. 4 is a flow chart of an example illustrating an example method 400 for virtualizing a physical device. The example method 400 can be performed, for example, by an AR/VR device (e.g., the AR headsets 102 and 202 in FIGS. 1 and 2), a devicelet (e.g., the devicelet 104 or 204) fully or partially residing on the AR/VR device, or other data processing apparatus associated with the AR/VR device. For instance, some or all operations of the example method 400 can be implemented by a hosted devicelet (e.g., the devicelet 104) or a remote devicelet (e.g., the client-side remote devicelet 204), or a hybrid devicelet.

At 410, a physical device is paired with the AR/VR device. The physical device can be a different, separate device from the AR/VR device. The physical device can be paired with the AR/VR device via wired or wireless technology to establish a communication channel between the physical device and the AR/VR device. For example, the physical device can be paired with the AR/VR device via Universal Serial Bus (USB) or Bluetooth connection.

The AR/VR device can include any AR or VR virtualized or partially virtualized devices. For example, the AR/VR device can wearable or non-wearable devices, such as, an AR headset, an AR/VR glasses/goggles/lens, or AR/VR enabled handheld devices. The physical device can include dummy or intelligent devices. For example, the physical device can include one or more of a keyboard, a mouse, a touch pad, a track pad, a touch screen, a camera, a sensor, a computer, a smartphone, a tablet, or an Internet of Things (IoT) device. The physical device can be virtualized by the AR/VR device, for example, by providing a virtual representation of the physical device to a user. In some implementations, the physical device can be virtualized by the AR/VR device before the AR/VR device receives a user interaction with the physical device. In some implementations, a user's interaction with the physical device can be in response to the virtual representation of the physical device to the user.

At 420, first data of a user interaction with the physical device is received by the AR/VR device from the physical device. For example, the user interaction with the physical device can include a touch or slide of a touch pad, a press of a physical keyboard, or a gesture in front of a camera or a motion sensor, etc. The physical device can detect the user interaction, record the user action as the first data, and transmit the first data to the AR/VR device, for example, through the communication channel established between the paired physical device and AR/VR device.

At 430, the first data of the user interaction with the physical device is converted into second data for representation of the user interaction with the physical device in a virtual representation of the physical device. In some implementations, converting the first data of the user interaction with the physical device into the second data further includes parsing the first data of the user interaction with the physical device, and determining from which physical device the user interaction is received. For example, the hardware management module 126 of the AR headset 102 may parse the first data and identify which physical device, among multiple devices that the AR headset 102 is connected to, the first data came from, for example, based on an identifier of the physical device included in the first data or certain specific format or feature of the first data.

In some implementations, converting the first data of the user interaction with the physical device into the second data can be performed, for example, by an emulation module (e.g., the device user interaction emulation 134 or 344). For example, the emulation module can receive the first data and translate the first data of the user interaction into the second data that is suitable for representation of the user interaction with the physical device in the virtual representation of the physical device. In some implementations, the second data can be further input into, or processed by, one or more of an I/O API (e.g., the I/O API 142 or 352), a virtual model of the physical device (e.g., the virtual model 180 or 380), device hardware glue logic (e.g., the device hardware glue logic 150 or 360) and the device core (e.g., the device core 192 or 392) to provide the representation of the user interaction with the physical device in the virtual representation of the physical device.

As an example, if the physical device is a smartphone, the AR/VR device can provide the user with a virtual representation, such as, an AR/VR projection of the smartphone on a wall, a desk, or any other surface or in a 3-dimensinoal space. The user interaction may include typing a text message using the physical keyboard or touch screen of the smartphone. As such, the first data of the user interaction with the physical device can include the corresponding key entries that the user pressed on the smartphone. The AR/VR device can receive the first data from the smartphone and parse the first data. An emulation module can map the first data into second data suitable for a virtual representation of the user's interaction with the smartphone. For example, the virtual representation of the user interaction can include displaying, in the AR/VR projection of the smartphone, a virtual hand typing the text message in the same manner as the user typing the text message using the physical keyboard or touch screen of the smartphone in real time.

In some implementations, converting the first data of the user interaction with the physical device into the second data can be performed, for example, by a hosted, remote, or hybrid devicelet. For instance, in the case of a remote devicelet, the conversion can be at least partially performed by a remote server (e.g., the remote server 302). For example, the conversion of the first data of the user interaction with the physical device into the second data for representation of the user interaction with the physical device can include redirecting, to a remote server, the first data of the user interaction with the physical device; and receiving, from the remote server, the second data for representation of the user interaction with the physical device in the virtual representation of the physical device.

At 440, the virtual representation of the physical device and the representation of the user interaction with the physical device are output by the AR/VR device. In some implementations, the virtual representation of the physical device and the representation of the user interaction with the physical device are rendered by an AR/VR display (e.g., the AR display 122 or 222) of the AR/VR device. The representation of the user interaction with the physical device can be embedded or otherwise integrated in the virtual representation of the physical device.

At 450, a tactile feedback in response to the user interaction with the physical device is output to the physical device. In some implementations, the tactile feedback can be provided in addition to the representation of the user interaction with the physical device in the virtual representation of the physical device. The additional tactile feedback allows the user to have more tangible and precise control of the physical device and, thus, enhance user experience.

In some implementations, in addition, or as an alternative, to the user interaction with the physical device (e.g., the smartphone), the user can interact with the virtual representation of the physical device (e.g., the AR/VR projection of the smartphone). For example, instead of pressing the buttons on the physical keyboard or touchscreen of the smartphone, the user may touch, point, or otherwise interact with the virtual keyboard or touchscreen of the AR/VR projection of the smartphone. In some implementations, the AR/VR device can detect such a second user interaction with the virtual representation of the physical device (e.g., from a camera, a motion sensor, or other hardware component of the AR/VR device). The AR/VR device can receive and parse third data of the second user interaction with the virtual representation of the physical device, for example, by the hardware management module 126 or 332. The third data of the second user interaction with the virtual representation of the physical device can be converted into fourth data for a second representation of the second user interaction with the virtual representation of the physical device in the virtual representation of the physical device, for example, by one or more of an emulation component (e.g., the device user interaction emulation 134 or 344), API (e.g., the movement API 144 or 354), virtual model (e.g., the virtual model 180 or 380), device hardware glue logic (e.g., the device hardware glue logic 150 or 360) and the device core (e.g., the device core 192 or 392). The second representation of the second user interaction with the virtual representation of the physical device can be output, for example, by an AR/VR display (e.g., the AR display 122 or 222) of the AR/VR device, in the virtual representation of the physical device.

In some implementations, the AR/VR device may include a physical component (e.g., a gyroscope or compass) that does not exist in the physical device. The AR/VR device can provide an emulation of the physical component of the AR/VR device in the virtual representation of the physical device so as to enhance the functionality of the virtual representation of the physical device. For instance, the user can interact with the emulation of the physical component of the AR/VR device in the virtual representation of the physical device and achieve the functionality that cannot be realized by the physical device itself. As an example, the user may move, rotate, or perform other actions with the AR/VR projection of the smartphone that may trigger an emulated gyroscope.

The AR/VR device may detect such a third user interaction with the emulation of the physical component of the AR/VR device in the virtual representation of the physical device (e.g., from a camera, a motion sensor, or other hardware component of the AR/VR device). Such a third user interaction with the emulation of the physical component of the AR/VR device may be represented as fifth data that includes the movements, rotations, and other interactions of the virtual representation of the physical device. The AR/VR device can receive and parse fifth data of the second user interaction with the virtual representation of the physical device, for example, by the hardware management module 126 or 332. The fifth data of the third user interaction with the emulation of the physical component of the AR/VR device can be converted into sixth data for a third representation of the third user interaction in the virtual representation of the physical device, for example, by one or more of an emulation component (e.g., the device user interaction emulation 134 or 344), API (e.g., the movement API 144 or 354), virtual model (e.g., the virtual model 180 or 380), device hardware glue logic (e.g., the device hardware glue logic 150 or 360) and the device core (e.g., the device core 192 or 392). The third representation of the third user interaction with the emulation of the physical component of the AR/VR device in the virtual representation of the physical device can be output, for example, by an AR/VR display (e.g., the AR display 122 or 222) of the AR/VR device, in the virtual representation of the physical device.

Some implementations of subject matter and operations described in this specification can be implemented in digital electronic circuitry, or in computer software, firmware, or hardware, including the structures disclosed in this specification and their structural equivalents, or in combinations of one or more of them. Some implementations of subject matter described in this specification can be implemented as one or more computer programs, i.e., one or more modules of computer program instructions, encoded on computer storage mediums for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various, different, computing model infrastructures, such as web services, distributed computing, and grid computing infrastructures.

A computer program (also known as a program, software, software application, script, or code) can be written in any form of programming language, including compiled or interpreted languages, as well as declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and are interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory, or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A client and server are generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). The relationship of client and server arises by virtue of computer programs running on the respective computers and having a client-server relationship to each other.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple implementations separately or in any suitable subcombination.

A number of examples have been described. Nevertheless, it will be understood that various modifications can be made. Accordingly, other implementations are within the scope of the following claims.

What is claimed is:

1. An augmented reality (AR) or virtual reality (VR) device (AR/VR device), the AR/VR device comprising:
   an AR/VR display;
   one or more physical hardware components for presenting a virtual representation of a to-be-virtualized device by the AR/VR display;
   at least one processor; and
   a non-transitory computer-readable storage medium coupled to the at least one processor and storing programming instructions for execution by the at least one processor, the programming instructions comprising:
      an emulation layer;
      one or more hardware emulation application program interfaces (APIs); and
      one or more hardware glue logics; and
   wherein the programming instructions instruct the at least one processor to:
      receive a code of core functionalities of the to-be-virtualized device, wherein the core functionalities comprises a functionality related to a hardware component that does not physically exist on the to-be-virtualized device; and
      emulate, by the AR/VR device, the functionality related to the hardware component that does not physically exist on the to-be-virtualized device, wherein the emulating comprises:
         receiving, by the emulation layer, a first data of a user interaction with the virtual representation of the to-be-virtualized device, the virtual representation comprising one or more of an image or a video visible to the user, the user interaction with the virtual representation of the to-be-virtualized device comprising one or more of a touch or a gesture of the user relative to the virtual representation of the to-be-virtualized device, the first data comprising an emulated output of the hardware component that does not physically exist on the to-be-virtualized device in response to the user interaction with the virtual representation of the to-be-virtualized device;
         passing, via a hardware emulation API corresponding to the functionality related to the hardware component that does not physically exist on the to-be-virtualized device, the emulated output to a hardware glue logic corresponding to the hardware component that does not physically exist on the to-be-virtualized device; and
         converting, by the hardware glue logic corresponding to the hardware component that does not physically exist on the to-be-virtualized device, the emulated output into the functionality related to the hardware component that does not physically exist on the to-be-virtualized device.

2. The AR/VR device of claim 1, wherein the one or more physical hardware components comprises one or more of a screen, a camera, a microphone, a speaker, a connectivity or communication interface.

3. The AR/VR device of claim 1, wherein the to-be-virtualized device comprises a virtual device that does not physically exist.

4. The AR/VR device of claim 1, wherein the code of core functionalities of the to-be-virtualized device comprise a code written specifically for the to-be-virtualized device or a code of an equivalent real-world counterpart of the to-be-virtualized device.

5. The AR/VR device of claim 1, wherein:
   the hardware component that does not physically exist on the to-be-virtualized device comprises one or more of a gyroscope, a compass, a virtualized electromagnet, a rumble motor, or an exterior motor; and
   the hardware emulation API corresponding to the functionality related to the hardware component that does not physically exist on the to-be-virtualized device comprises a movement API.

6. The AR/VR device of claim 1, wherein:
   the hardware component that does not physically exist on the to-be-virtualized device comprises one or more of a Bluetooth, Wi-Fi, cellular, Near Filed Communications (NFC), Universal Serial Bus (USB), or Global Positioning System (GPS), hardware component; and
   the hardware emulation API corresponding to the functionality related to the hardware component that does not physically exist on the to-be-virtualized device comprises a connectivity API.

7. The AR/VR device of claim 1, further operable to pair with the to-be-virtualized device.

8. A method for virtualizing a to-be-virtualized device using an augmented reality (AR) or virtual reality (VR) device (an AR/VR device), the method comprising:
   receiving, by the AR/VR device, a code of core functionalities of the to-be-virtualized device, wherein the core functionalities comprises a functionality related to a hardware component that does not physically exist on the to-be-virtualized device;
   presenting, by an AR/VR display of the AR/VR device, a virtual representation of the to-be-virtualized device; and
   emulating, by the AR/VR device, the functionality related to the hardware component that does not physically exist on the to-be-virtualized device, wherein the emulating comprises:
      receiving, by the AR/VR device, a first data of a user interaction with the virtual representation of the to-be-virtualized device, the virtual representation comprising one or more of an image or a video visible to the user, the user interaction with the virtual representation of the to-be-virtualized device comprising one or more of a touch or a gesture of the user relative to the virtual representation of the to-be-virtualized device, the first data comprising an emulated output of the hardware component that does not physically exist on the to-be-virtualized device in response to the user interaction with the virtual representation of the to-be-virtualized device;
      passing, via a hardware emulation application program interface (API) corresponding to the functionality related to the hardware component that does not physically exist on the to-be-virtualized device, the emulated output to a hardware glue logic corresponding to the hardware component that does not physically exist on the to-be-virtualized device; and
      converting, by the hardware glue logic corresponding to the hardware component that does not physically exist on the to-be-virtualized device, the emulated output into the functionality related to the hardware component that does not physically exist on the to-be-virtualized device.

9. The method of claim 8, further comprising pairing the to-be-virtualized device with the AR/VR device.

10. The method of claim 8, wherein the to-be-virtualized device comprises a virtual device that does not physically exist.

11. The method of claim 8, wherein the code of core functionalities of the to-be-virtualized device comprise a code written specifically for the to-be-virtualized device or a code of an equivalent real-world counterpart of the to-be-virtualized device.

12. The method of claim 8, wherein:
the hardware component that does not physically exist on the to-be-virtualized device comprises one or more of a gyroscope, a compass, a virtualized electromagnet, a rumble motor, or an exterior motor; and
the hardware emulation API corresponding to the functionality related to the hardware component that does not physically exist on the to-be-virtualized device comprises a movement API.

13. The method of claim 8, wherein:
the hardware component that does not physically exist on the to-be-virtualized device comprises one or more of a Bluetooth, Wi-Fi, cellular, Near Filed Communications (NFC), Universal Serial Bus (USB), or Global Positioning System (GPS), hardware component; and
the hardware emulation API corresponding to the functionality related to the hardware component that does not physically exist on the to-be-virtualized device comprises a connectivity API.

14. A non-transitory computer-readable medium stored in an augmented reality (AR) or virtual reality (VR) device (AR/VR device), the computer-readable medium storing instructions comprising:
an emulation layer;
one or more hardware emulation application program interfaces (APIs); and
one or more hardware glue logics;
wherein the instructions, when executed by a data processing apparatus, cause the AR/VR device to perform operations comprising:
receiving a code of core functionalities of a to-be-virtualized device, wherein the core functionalities comprises a functionality related to a hardware component that does not physically exist on the to-be-virtualized device;
presenting a virtual representation of the to-be-virtualized device by an AR/VR display; and
emulating the functionality related to the hardware component that does not physically exist on the to-be-virtualized device, wherein the emulating comprises:
receiving, by the emulation layer, a first data of a user interaction with the virtual representation of the to-be-virtualized device, the virtual representation comprising one or more of an image or a video visible to the user, the user interaction with the virtual representation of the to-be-virtualized device comprising one or more of a touch or a gesture of the user relative to the virtual representation of the to-be-virtualized device, the first data comprising an emulated output of the hardware component that does not physically exist on the to-be-virtualized device in response to the user interaction with the virtual representation of the to-be-virtualized device;
passing, via a hardware emulation API corresponding to the functionality related to the hardware component that does not physically exist on the to-be-virtualized device, the emulated output to a hardware glue logic corresponding to the hardware component that does not physically exist on the to-be-virtualized device; and
converting, by the hardware glue logic corresponding to the hardware component that does not physically exist on the to-be-virtualized device, the emulated output into the functionality related to the hardware component that does not physically exist on the to-be-virtualized device.

15. The non-transitory computer-readable medium of claim 14, wherein to-be-virtualized device comprises a virtual device that does not physically exist.

16. The non-transitory computer-readable medium of claim 14, wherein the code of core functionalities of the to-be-virtualized device comprise a code written specifically for the to-be-virtualized device or a code of an equivalent real-world counterpart of the to-be-virtualized device.

17. The non-transitory computer-readable medium of claim 14, wherein:
the hardware component that does not physically exist on the to-be-virtualized device comprises one or more of a gyroscope, a compass, a virtualized electromagnet, a rumble motor, or an exterior motor; and
the hardware emulation API corresponding to the functionality related to the hardware component that does not physically exist on the to-be-virtualized device comprises a movement API.

18. The non-transitory computer-readable medium of claim 14, wherein:
the hardware component that does not physically exist on the to-be-virtualized device comprises one or more of a Bluetooth, Wi-Fi, cellular, Near Filed Communications (NFC), Universal Serial Bus (USB), or Global Positioning System (GPS), hardware component; and
the hardware emulation API corresponding to the functionality related to the hardware component that does not physically exist on the to-be-virtualized device comprises a connectivity API.

19. The non-transitory computer-readable medium of claim 14, wherein the operations further comprising pairing with the to-be-virtualized device.

* * * * *